Dec. 30, 1924.

R. E. WINTERS

CAR WHEEL

Filed May 10, 1924

INVENTOR
Roger E. Winters
By W. W. Williamson
Atty.

Dec. 30, 1924.
R. E. WINTERS
CAR WHEEL
Filed May 10, 1924   2 Sheets-Sheet 2

1,521,347

INVENTOR
Roger E. Winters
By W. W. Williamson Atty.

Patented Dec. 30, 1924.

1,521,347

UNITED STATES PATENT OFFICE.

ROGER E. WINTERS, OF PHILADELPHIA, PENNSYLVANIA.

CAR WHEEL.

Application filed May 10, 1924. Serial No. 712,421.

*To all whom it may concern:*

Be it known that I, ROGER E. WINTERS, a citizen of the United States, residing at Philadelphia, in the county of Philadelphia and State of Pennsylvania, have invented new and useful Improvements in a Car Wheel, of which the following is a specification.

My invention relates to new and useful improvements in a car wheel, and has for its primary object to construct such a device with a removable tire whereby the latter may be readily and quickly put on if said tire, as a whole, or any portion thereof, be damaged in any way.

Another object of this invention is to provide a car wheel including a hub, a web and felly, as one element, and a removable tire, including a rim and flange, as the other element, the felly and tire having interengaging means to attach one to the other.

A further object of this invention is to provide a car wheel rim with one or more projections, ribs or tongues arranged obliquely to the side edges of said rim for coaction with similarly shaped and arranged groove or grooves in the periphery of the car wheel felly and further provided with means to hold the parts against accidental displacement.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawings forming a part of this application, in which:—

Figure 1:
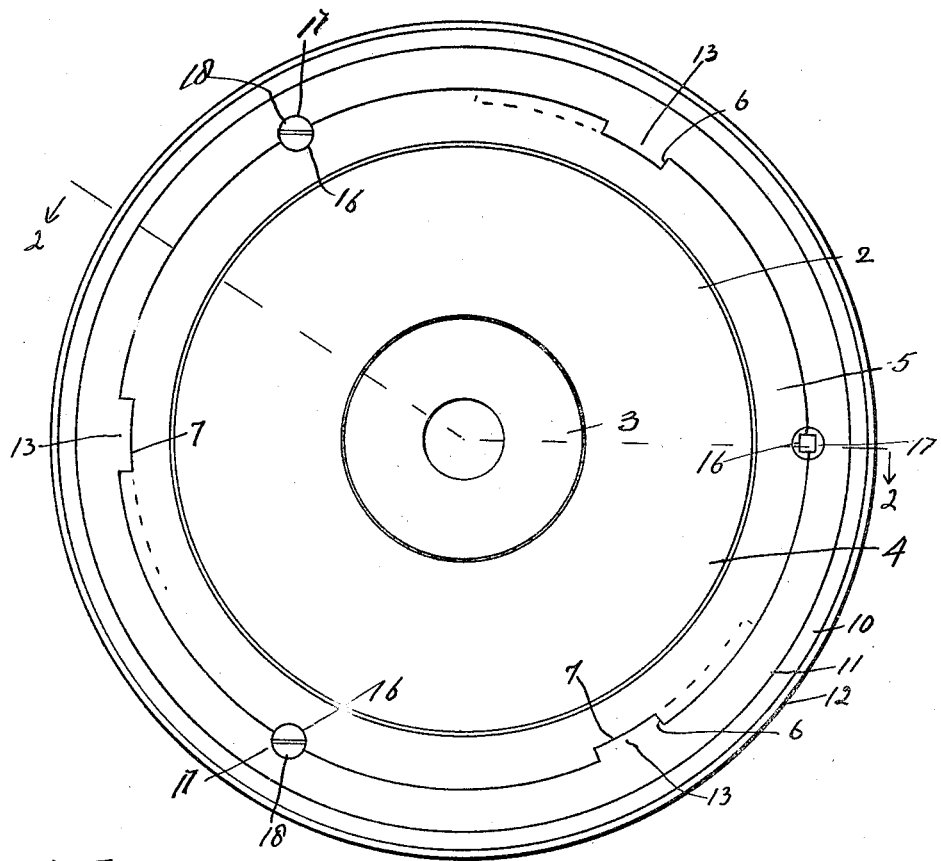
Fig. 1, is a face view of a car wheel constructed in accordance with my invention.
Figure 2:
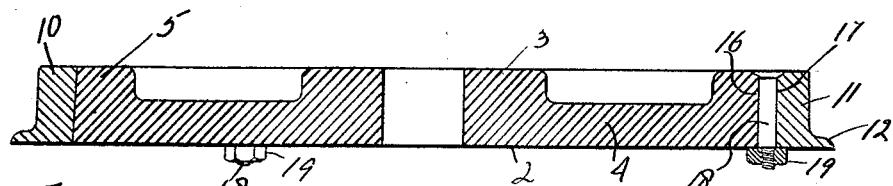
Fig. 2, is a section at the line 2—2 of Fig. 1.
Figure 3:
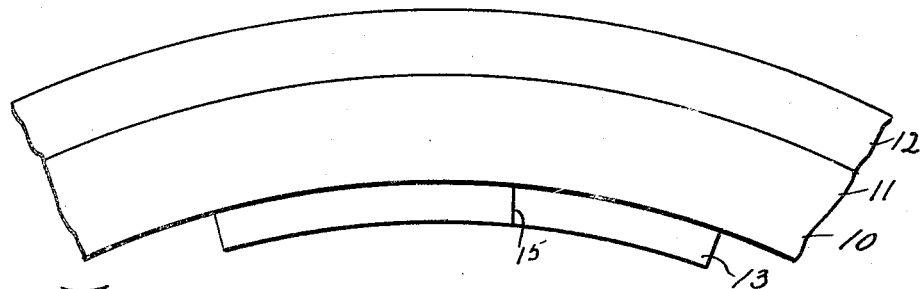
Fig. 3, is an enlarged fragmentary side elevation of the removable tire.
Figure 4:
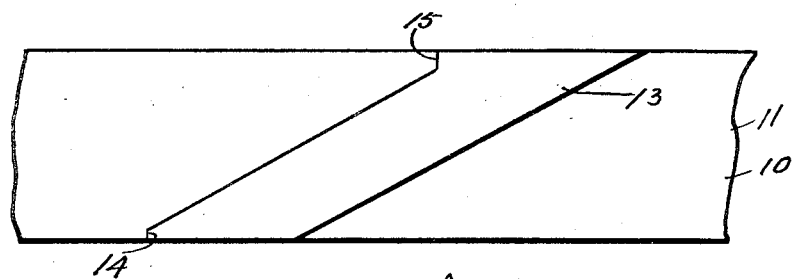
Fig. 4, is an inner face view thereof.
Figure 5:
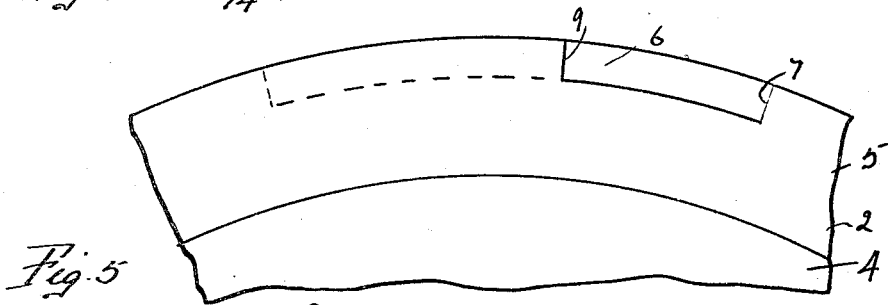
Fig. 5, is an enlarged fragmentary side elevation or face view of the car wheel proper or felly.
Figure 6:
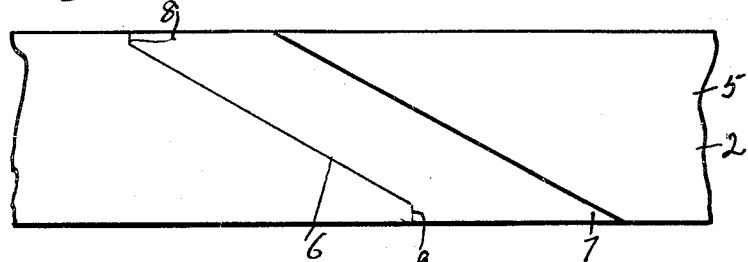
Fig. 6, is a peripheral or edge view of the same.

In carrying out my invention as herein embodied, 2 represents the car wheel proper comprising the usual hub 3, web 4 and felly 5 the periphery or outer face of the latter being beveled and having one or more grooves 6 formed in its outer circumference or periphery and these grooves are arranged obliquely to the side edges of the felly, as plainly shown in Fig. 6. The groove or grooves 6 each are tapered or have their side walls converging from the inlet or mouth end 7 toward the opposite end and while one of the side walls is straight throughout the other has an offset at each end represented by the numerals 8 and 9.

Coacting with the wheel proper and more particularly with the felly, is a removable tire 10 comprising a rim 11, internally beveled to correspond to the bevel of the felly, and a flange 12 and from the inner circumference of the tire, or its rim, project one or more ribs or tongues 13 corresponding in number to the grooves 6 and these tongues or ribs are arranged transversely of the tire but in an oblique position so as to correspond with the grooves 6 and like said grooves are tapered so that the smaller end of a tongue may be inserted in a groove and by simultaneously sliding the tire transversely of the felly and rotating it a tongue will be caused to enter a groove until the shoulders 14 and 15 engage the offsets 8 and 9 respectively, at which time the tongue should be wedged tightly in the groove.

In order to prevent the accidental displacement of the tire from the felly I provide similar transverse grooves 16 and 17 in the felly and the tire respectively which when the parts are properly positioned form complete rectangular holes and although I have shown three sets of these grooves it is obvious that this number may be increased or decreased as desired.

When the tire is properly positioned on the felly so that two of the grooves 16 and 17 align, a bolt 18, rectangular in cross section, or its equivalent is inserted in the hole thus formed and a nut 19 screwed on the projecting reduced threaded end. Although not essential it is preferable that the head of the bolt be countersunk in the tire and felly. It is obvious that any suitable locking means may be used with the nut 19 to prevent the same backing off.

In practice when it is necessary or desirable to remove the tire because of damage or any other reason the fastening device or devices conventionally shown as bolts and nuts are removed and the tire rotated at the same time it is moved transversely of the felly. This coaction will withdraw the tongues or ribs 13 from the grooves 6 and thus completely remove the tire from the felly. After this has been done another tire may be readily and quickly placed on the felly by reversing the operations above described.

Of course I do not wish to be limited to the exact details of construction as herein shown as these may be varied within the limits of the appended claim without departing from the spirit of my invention.

Having thus fully described my invention, what I claim as new and useful is:—

A car wheel comprising, in combination, a hub, a web, a felly, said felly having tapered grooves arranged diagonally to the side edges of the felly, one of the side walls of each groove being straight and the other side wall of each groove having an offset at each end, said felly being further provided with a transverse groove in its periphery, a tire including a rim and flange, said rim having tapered ribs or tongues arranged diagonally to the side edges thereof for insertion in the tapered grooves in the felly, a shoulder at each end of each rib on one side thereof for coaction with the offsets in the various tapered grooves, said rim further having a transverse groove in its inner surface to align with the similar groove in the felly, a bolt of rectangular cross sectional shape insertible in the hole formed by the alignment of these two grooves and a nut on said bolt.

In testimony whereof, I have hereunto affixed my signature.

ROGER E. WINTERS.